United States Patent
Domosi et al.

(10) Patent No.: US 11,165,563 B2
(45) Date of Patent: Nov. 2, 2021

(54) SYMMETRIC KEY STREAM CIPHER CRYPTOGRAPHIC METHOD AND DEVICE

(71) Applicant: Intelligens Technologiak Kft., Debrecen (HU)

(72) Inventors: Pal Bela Domosi, Debrecen (HU); Geza Horvath, Debrecen (HU)

(73) Assignee: Intelligens Technologiak Kft., Debrecen (HU)

( * ) Notice: Subject to any disclaimer, the term of this patent is extended or adjusted under 35 U.S.C. 154(b) by 41 days.

(21) Appl. No.: 16/621,300

(22) PCT Filed: Jun. 13, 2018

(86) PCT No.: PCT/IB2018/054284
§ 371 (c)(1),
(2) Date: Dec. 11, 2019

(87) PCT Pub. No.: WO2018/229666
PCT Pub. Date: Dec. 20, 2018

(65) Prior Publication Data
US 2020/0099514 A1    Mar. 26, 2020

(30) Foreign Application Priority Data

Jun. 15, 2017  (HU) .................................... PI700259
Nov. 30, 2017  (HU) .................................... PI700499

(51) Int. Cl.
*H04L 9/06* (2006.01)
*H04L 9/08* (2006.01)

(52) U.S. Cl.
CPC .......... *H04L 9/0668* (2013.01); *H04L 9/0869* (2013.01)

(58) Field of Classification Search
CPC .... H04L 9/0668; H04L 9/0869; H04L 9/0662
See application file for complete search history.

(56) References Cited

U.S. PATENT DOCUMENTS

2009/0092251 A1*  4/2009  Domosi ................ H04L 9/3247
                                                                  380/255
2013/0170638 A1   7/2013  Tateishi et al.
2015/0033018 A1*  1/2015  Tateishi ................ H04L 9/0819
                                                                  713/171

FOREIGN PATENT DOCUMENTS

WO     2015028830 A1    3/2015

OTHER PUBLICATIONS

European Patent Office, International Preliminary Report on Patentability in PCT Application No. PCT/IB2018/054284, dated Jul. 18, 2019.

(Continued)

*Primary Examiner* — Meng Li
(74) *Attorney, Agent, or Firm* — Wood Herron & Evans LLP (57) ABSTRACT

The subject of the invention is a symmetric key stream cipher cryptographic method for encrypting plaintexts and decrypting ciphertexts during which process a text to be encrypted or an encrypted text is scanned with an input/output data buffer (5), a pseudo random number is created with a pseudo random number generator (8) with a seed (12), a key automaton (11) is used for encryption and/or decryption. It is characterized in that the procedure involves the method whereby using the characters of the text scanned by the input/output data buffer (5) and the pseudo random number generated by the pseudo random number generator (8), an element of the key automaton's (11) transition matrix is directly reached from the input/output data buffer (5); the procedure is then repeated. A symmetric key stream cipher cryptographic device for implementing the method of claim 1 is also the subject of the invention.

3 Claims, 1 Drawing Sheet

(56) References Cited

OTHER PUBLICATIONS

European Patent Office, International Search Report and Written Opinion in PCT Application No. PCT/IB2018/054284, dated Sep. 11, 2018.
European Patent Office, Written Opinion of the International Preliminary Examining Authority in PCT Application No. PCT/IB2018/054284, dated May 7, 2019.
Pál Dömösi et al., A novel cryptosystem based on abstract automata and Latin cubes, Studia Scientiarum Mathematicarum Hungarica, vol. 52, No. 2, Jul. 1, 2015, pp. 1-11, XP55503968.

* cited by examiner

SYMMETRIC KEY STREAM CIPHER CRYPTOGRAPHIC METHOD AND DEVICE

TECHNICAL FIELD

The invention relates to a cryptographic method and device for stream cipher encrypting a plaintext and for stream cipher decrypting a ciphertext.

THE CURRENT STATE OF TECHNOLOGY

During the history of cryptography, we can find many examples where encryption systems (also known as cryptosystems), which had been considered very safe, proved to be breakable due to the advances in technology and science. At present the Vernam system [Vernam, G. S.: Secret Signaling System. U.S. Pat. No. 1,310,719, 1919], or otherwise known as the one-time pad system (OTP system) is the only known system, which is provably unbreakable. [Shannon, C. E.: Communication Theory and Secrecy Systems. Bell System Technical Journal, 28 (4), 1949, 656-715]. Despite its high security, the use of this system has not been widespread because the system only guarantees security if the key is used only once, and because the length of the secret key cannot be shorter than the length of the plaintext. The OTP is a symmetric-key encryption system. In the case of symmetric-key encryption systems, the encrypting and decrypting keys are either identical or can easily be calculated from one another. For this reason, both encryption and decryption keys must be kept secret, which only the sender and the receiver of the secret message can know. The other main type of cryptosystems is the asymmetric, or otherwise known as public-key cryptographic systems. In asymmetric encryption systems, it is impossible to define the decryption key solely relying on the public key (i.e. without additional information). The principle of public-key encryption was discovered in 1976 [Diffie, W., Hellman, M. E.: New Directions in Cryptography. IEEE Transactions on Information Theory, vol. IT-22, November 1976, 644-654], and before this discovery, all cryptosystems were symmetric key systems. According to another kind of classification, we can distinguish stream ciphers and block ciphers. Stream ciphers encrypt the plaintext character by character, while block ciphers divide the plaintext into usually 16-character-long blocks and link each plaintext block to a ciphertext block.

The encryption method and device discussed here is a symmetric stream cipher based on automata theory.

There are four major groups of cryptosystems based on automata theory:

In encryption systems based on Mealy automata or on their generalization, the Mealy automaton (or a generalization thereof) will receive the plaintext as an input, and the ciphertext will be the output of the Mealy automaton (or one of its generalizations) generated by this input. The decryption is the same, only during decryption, the ciphertext is the input recovered plaintext is the output. [Gysin, M.: One-key cryptosystem based on a finite non-linear automaton. In: E. Dawson and J-Golic, eds., Proc. Int. Conf. Proceedings of the Cryptography: Policy and Algorithms, Lecture Notes in Computer Science, 1029, Springer-Verlag, Berlin, pages 165-163. CPAC'95, Brisbane, Queensland, Australia, Jul. 3-5 1995; Rayward-Smith, V. J.: Mealy machines as coding devices. In: Beker, ~H.~J. and Piper, F.~C. eds., Cryptography and Coding. Claredon Press, Oxford, 1989; Tao, R.: Finite Automata and Application to Cryptography. Springer-Verlag, Berlin, 2009; Tao, R. and Chen, S.: The generalization of public-key cryptosystem fapkc4. Chinese Science Bulletin, 44(9):784-790, 1999; Atanasiu, A.: A class of coders based on gsm. Acta Informatica, 29:779-791, 1992]

For systems based on automata without outputs, a key automaton is used, which encrypts a plaintext character by character (i.e., as a stream cipher), each character is assigned by an encrypted block of variable length and thus based on the system's encryption, a ciphertext is generated the length of which substantially exceeds that of the plaintext. [P. Dömösi: A Novel Stream Cipher Based on Finite Automata. Vlad, Madalin Stefan and Sgarciu, Valentin (eds.): Intellisec'09, Proc. 1st Int. Conf. On Intelligent Security Systems, Nov. 11-14, 2009, Bucharest, Romania, Editura Printech, 16-25, 2009; P. Dömösi: A Novel Cryptosystem Based on Finite Automata without Outputs. In: Ito, Masami; Kobayashi, Yuji; Shoji, Kunitaka (eds.): AFLAS'08, Proc. Int. Conf. On Automata, Formal languages and Algebraic Systems, Kyoto, Japan, 20-22 Sep. 2008. World Scientific, New Jersey, London, Singapore, Beijing, Shanghai, Hong Kong, Taipei, Chennai, 2010, 23-32, 2010—from now on referred to as Dömösi-1; Khaleel, Gh., Turaev, S., Zhukabayeva, T., A Novel Stream Cipher Based on Nondeterministic Finite Automata. In: Information Technologies in Science, Management, Social Sphere and Medicine (ITSMSSM 2016), 23-26 May 2016, Tomks, Russia, Atlantis Press, 110-115, 2016.—from now on referred to as Khaleel-Turaev-Zhukabayeva].

In block ciphers based on cellular automata, the plaintext is a state of the cellular automaton, and the ciphertext will be generated by a new state following a certain number of steps. Decryption works in the same way, starting out from the ciphertext as a state, we define the new state following a certain number of steps as plaintext. [S. Wolfram: Cryptography with Cellular Automata. In: C. W. Hugh, eds., Proc. Conf. Advances in Cryptology—CRYPTO '85, Santa Barbara, Calif., USA, Aug. 18-22, 1985, LNCS 218, Springer-Verlag, Berlin, 1986, 429-432; Habutsu, T., Nishio, Y., Sasase, I., Mori S.: A Secret Key Cryptosystem by Iterating a Chaotic Map. In: D. W. Davies, ed., Proc. Conf. Advances in Cryptology—EUROCRYPT '91, Workshop on the Theory and Application of Cryptographic Techniques, Brighton, UK, Apr. 8-11, 1991, 127-140; Sen, S., Shaw, C., Chowdhuri, D. R., Ganguly, N., Chaudhuri P. P.: Cellular automata-based cryptosystem (CAC). In: R. Deng, S. Qing, F. Bao, J. Zhou eds., Proc. 4th Int.Conf. on Information and Data Security—ICIS 2002, Dec. 9-12, 2002, Singapore LNCS 2513, Springer-Verlag, 2002, 303-314; Gutowitz, H.: Method and apparatus for encryption, decryption and authentication using dynamical systems, U.S. Pat. No. 5,365, 589, 1992; Kari, J.: Cryptosystems based on reversible cellular automata. Publ: University of Turku, Finland, April, 1992, preprint].

The key automaton of block ciphers based on automata network is an automata composition, the transition table of which cannot be stored in a conventional way due to size problems. For this reason, the key automaton is produced as a composite of smaller automata in a way that storing the transition table of the component automata and storing of the structure of the automata composition is no longer a problem. In addition, the composite design of the automaton allows for parallel processing, which improves speed. The system assigns to each plaintext block that given state of the key automaton (as a key automaton ciphertext block), that has the same serial number as the plaintext block, chosen through an input signal or input sequence created by a pseudo-random number generator. Of course, the pseudo-random number generator's seed is also part of the cipher key. [P. Dömösi and G. Horváth: A novel cryptosystem based on abstract automata and Latin cubes. Studia Scientiarum Mathematicarum Hungarica, 52(2):221-232.—from now on referred to as Dömösi-Horváth-1; P. Dömösi and G. Horváth: A novel cryptosystem based on Glushkov product of automata. Acta Cybernetica, 22:359-371.—from now on referred to as Dömösi-Horváth-2; Khaleel, Gh., Turaev, S., Tamrin, M. I. M. and Al-Shaikhli, I. F.: A New Block Cipher Based on Finite Automata Systems. Int. J. on Perceptive and Cognitive Computing (IJPCC), Vol 2, Issue 1, 23-26, 2016.—from now on referred to as Khaleel-Turaev-Tamrin-Al-Shaikhli.]

Almost all well-known automata theory-based cryptosystems have serious problems in applications:

some of them are easy to break [Bao, F.: Cryptoanalysis of partially known cellular automata. IEEE Trans. on Computers, 53: 1493-1497, 2004; F. Bao and Y. Igarashi: Break finite automata public-key cryptosystem. In: Zoltán Fülöp, Ferenc Gécseg, eds., Proc. 22nd Int. Coll. on Automata Languages and Programming—ICALP'95, Szeged, Hungary, Jul. 10-14, 1995, LNCS 944, Springer-Verlag, Berlin, 1995, 147-158; Biham, E.: Cryptoanalysis of the chaotic map cryptosystem suggested at Eurocrypt'91. In: Davies, D. W. ed., Proc. Conf. Advances in Cryptology, Workshop on the Theory and Application of Cryptographic Techniques, Brighton, UK, pages 532-534. EUROCRYPT'91, Apr. 8-11 1991; Dawei, D. Wu, K., Huanguo, Z.: Cryptanalysis on a finite automaton public-key cryptosystem, Science in China, Series E, Vol 39, No 1 (1996), 27-36; Meskaten, T.: On finite automaton public-key cryptosystems. TUCS Technical Report, Turku Centre for Computer Science, Turku, No. 408:1-42, 2001.], the technical implementation of others results in slow operation, while the technical implementation of others makes the size of the ciphertext significantly larger than the plaintext [Dömösi P.: Szimmetrikus kulcsú kriptográfiai berendezés és eljárás információk titkosítására és visszafejtésére, Hungarian patent, Patent Number: 227781; Khaleel, Gh., Turaev, S., Izzudin, M., Tamrin, M., Al-Shaikhli, I. F.: Performance and Security Improvements of Dömösi's Cryptosystem. Int. J. Appl. Math. Stat.; Vol. 55; Issue No. 2; 32-45, 2016], in others, difficulties arise when choosing the key automaton [Kari, J.: Reversibility of 2d cellular automata is undecidable. Physica D, 45:379-385, 1990.], yet others have not been subjected to strict cryptographic analysis, and so the security of these systems is largely unknown [Guan, P.: Cellular automaton public-key cryptosystem. In: Complex Systems, 1 (1987), 51-56; Clarridge, A. and K. Salomaa: A cryptosystem based on the composition of reversible cellular automata. LATA, LNCS 5457, pages 314-325; Guan, P.: Cellular automaton public-key cryptosystem. In: Complex Systems, 1 (1987), 51-56.].

All of these problems can be solved with the help of symmetric key block ciphers created over the past few years that are based on automata networks [Dömösi-Horváth-1; Dömösi-Horváth-2, Khaleel-Turaev-Tamrin-Al-Shaikhli].

On the other hand, block ciphers based on automata networks have a much more complicated structure than symmetric-key systems, and therefore are more difficult to implement, furthermore, they require a larger quantity of operations, resulting in slower operation.

The present invention is similar to Mealy automata-based encryption systems in as much as the generation and decoding of the encrypted message are both done through a key automaton. The present invention does not involve the properties of weakly invertable automata, therefore the present invention is immune to methods used to break the FAPKC and FAPKC-3 encryption systems [Tao, R.: Finite Automata and Application to Cryptography. Springer-Verlag, Berlin, 2009; Tao, R. and Chen, S.: The generalization of public-key cryptosystem fapkc4. Chinese Science Bulletin, 44(9):784-790, 1999] as well.

The present invention is most similar to systems based on automata without outputs, in that the key automaton here is also an automaton without output. In contrast to systems based on automata without output, the key automaton in the present system has no final states, furthermore, the transition matrix of the key automaton is a Latin square in order to avert the possibility of statistical attacks. However, this system's significant advantage over encryption systems based on automata without output [Dömösi 1; Dömösi P.: Szimmetrikus kulcsú kriptográfiai berendezés és eljárás információk titkosítására és visszafejtésére, Hungarian patent, Patent Number: 227781; Khaleel-Turaev-Zhukabayeva; Khaleel, Gh., Turaev, S., Izzudin, M., Tamrin, M., Al-Shaikhli, I. F.: Performance and Security Improvements of Dömösi's Cryptosystem. Int. J. Appl. Math. Stat.; Vol. 55; Issue No. 2; 32-45, 2016], is that the ciphertext is not longer than the plaintext, the two are of equal length, and this way we gain substantial storage space.

The present invention is similar to cellular automata-based encryption systems, in that the key-automaton here is an automaton without output, just like the cells constituting the cellular automaton. Further, in the present invention, the encrypted message is generated in a similar manner as in the case of cellular automata, with the help of the state transitions of the key-automaton, through the manipulation of states. In addition, the pseudo-random number generator is completely independent of the key automaton, thus the system is also resistant to the usual attacks against cellular automaton-based pseudo-random number generators [Meier, W. and Staffelbach, O.: Analysis of pseudo random sequences generated by cellular automata. In: Davies, D. W. (ed.), Proc. Conf. Advances in Cryptology—EUROCRYPT '91, Workshop on the Theory and Application of Cryptographic Techniques, Brighton, UK, Apr. 8-11, 1991, LNCS 547 Springer-Verlag, Berlin, 1991, 186-199.] Furthermore—in contrast to certain cellular automata systems —, due to the simple structure of the key-automaton in the method and device of the present invention, the finding of the inverse automaton necessary for decrypting can be obtained by a very simple and fast algorithm with previous knowledge of the key automaton.

Finally, if we consider the automata networks in automata network-based encryption systems as a single automaton, we will obtain a cryptographic system similar to the present invention.

Contrary to the key-automaton of the system described in the present application, the storage of an automata network is fairly complicated because of the very large size of the network. Since the key automaton described in the present application is not an automata network but a very special, relatively small automaton without output, in comparison to automata networks [[Dömösi-Horváth-1; Dömösi-Horváth-2, Khaleel-Turaev-Tamrin-Al-Shaikhli]. (and thus, in contrast to cellular automata-based systems as well [Guan, P.: Cellular automaton public-key cryptosystem. In: Complex Systems, 1 (1987), 51-56; Clarridge, A. and K. Salomaa: A cryptosystem based on the composition of reversible cellular automata. LATA, LNCS 5457, pages 314-325; Guan, P.: Cellular automaton public-key cryptosystem. In: Complex Systems, 1 (1987), 51-561), the key automaton is small-sized, because of which the operation of the key automaton of the system described in the present application is significantly simpler than systems based on automata networks.

The method used in the present application resembles the method (used in current state-of-the-art technology) not relying on automata theory-based stream ciphers, in that during the generation of the ciphertext we too use a pseudo random number generator. The main difference is that in the present application, the cryptographic procedure creates the next (at first the first one) character of the ciphertext in a way that based on the pseudo random number generator's seed, the pseudo random number generator creates the next (at first the first) pseudo random character sequence of given length (preferably 16 or 32 character (byte or half byte)-long one), which then serves as an input signal sequence for the key automaton, which (effected by this input signal sequence) transits through a sequence of states, starting from the state that is the same as the plaintext's next (at first the first one) character to the state sequence's last element, which is the same as the ciphertext's next (at first its first) character. As will be explained in detail, as opposed to current state-of-the-art methods not relying on automata theory-based stream ciphers, this method is resistant to known plaintext-based attacks. In addition, as will be more fully described, the cryptographic method and device subject to the present application is resistant to statistical attacks and brute force attack.

THE TASK TO BE SOLVED, AND THE REALIZATION MAKING THE SOLUTION POSSIBLE

The cryptographic method and device involved in the present invention is a symmetric key stream cipher, which transforms the input plaintext into ciphertext by means of the stream cipher encrypting and decrypting device and the stream cipher encryption key and transforms the incoming ciphertext into plaintext using the stream cipher encrypting and decrypting device and the stream cipher encryption key.

The essence of the present invention's method and device is that the method of encrypting the plaintext chooses the ciphertext's next (at first the first) character to be the one that corresponds to the state of the key automaton, into which the state corresponding to the plaintext's next (at first the first) character is transferred by that incoming signal sequence of key automaton, which corresponds to the next (at first the first) block of the pseudo random number generator. The decryption is the same, only there it is the ciphertext that is restored into the original plaintext, and instead of the key automaton, the inverted key automaton, instead of the generated pseudo random blocks their mirror image is used.

The technical novelty of the invention as compared to the other processes and devices discussed can be explained by the following realizations:

According to current state-of-the-art technology, the stream ciphers not based on automata theory function in a way that during encryption a pseudo random number generator generates pseudo random binary strings, which they mod 2 add bit-by-bit to the digitized plaintext-as-binary-string (i.e. they apply exclusive or binary operation), and the resulting binary string will be the ciphertext. During decryption we perform the same operation applying the same pseudo random bit sequence on the ciphertext, thus regaining the original digitized plaintext.

This way, a crucial characteristic of non-automata-based encryption systems (e.g. RC4) is that during both encryption and decryption only two operations are performed. One is the reading of the text (during encryption the plain, during decryption the ciphertext), the other is the repeated performance of the operation governed by the pseudo random number that was generated by the pseudo random number generator; in detail this means that we mod 2 add up bit-by-bit (i.e. apply an exclusive or logical operation) the digitized plaintext (during encryption) or the digital ciphertext (during decryption) and the pseudo random bit string generated by a pseudo random number generator. This way, we achieve a cryptosystem that is faster even than the AES-256, the symmetric block cipher accepted by the NIST (The National Institute of Standards and Technology, USA). For instance, based on data in secondary literature, the widely used, renown symmetrical stream cipher, the RC4 is around 3-times faster than the AES-256. [B. Nithya, P. Sripriya: Comparative Analysis of Symmetric Crypographic Algorithms on Net Platform. Indian Journ. of Sci. and Techn., Vol 9 (27), 2016.]

It is easy to see that the non-automata theory-based stream ciphers are easily breakable with the known plaintext attacks. This is because once we mod 2 bit-by-bit add up (i.e. apply an exclusive or logical operation) the plaintext and the ciphertext as binary strings, the resulting bit string will coincide with the pseudo random binary string used during encryption. This way however the attacker will be able to send forged messages to the addressees. On top of that, once the attacker gets hold of the pseudo random string in question, they will be able to decrypt all the ciphertext messages that were encrypted using that pseudo random string or its prefix. Because of this, the application of non-automata theory-based stream ciphers is not recommended in cases where there is a danger of known plaintext attacks. [A. Tanenbaum, D. J. Wetherall: Computer Networks, Pearson, Mass., 2011]. (A known plaintext attack means that the attacker has access to certain plaintexts and their ciphertexts. In the cases discussed above, a known plaintext attack can be launched even if only a single such text-pair is available). For instance, the already mentioned RC4 stream cipher is also vulnerable to known plaintext attacks. [https://en.wikipedia.org/wiki/RC4] Let us remark, that the Mealy automata-based symmetric stream ciphers are also vulnerable to known plaintext attacks. [G. Khaleel, S. Tuarev, I. Al-Shaihli, M. Tamrin: An Overview of cryptosystems based on finite automata. Jour. Advanced Review on Scientific Research, 27, Issue 1 (2016), 1-7]. Further, it is also noteworthy that according to research results published a couple of years ago the RC4 stream cipher is not only vulnerable to known plaintext attacks, but to other types of attacks as well, and therefore it is used less and less often. [L. Stosic, M. Bogdanovic: RC4 Stream Cipher and possible Attacks on WEP. IJACSA, Vol 3, No 3, 2012; D. Holmes: Goodbye to RC4, an Old Crypto Favorite. Security Week, Nov. 12, 2015.]

It is a novel realization that we may achieve a stream cipher that is resistant to known plaintext attacks if (in a similar fashion to solutions used in non-automata theory based stream ciphers) both during encryption and decryption we perform the repeated application of a single type of operation which is governed by the input and a pseudo random number generated by a pseudo random number generator; this type of operation is the direct access in the storage space of an element of a square matrix. This way the known plaintext attack is ineffective, given that the bit-by-bit mod 2 adding up of the digitized plaintext and the corresponding ciphertext does not result in the recovery of the random string used during encryption and decryption.

As far as the operational speed of encryption and decryption is concerned, our solution proposed here is an encryption and decryption system that is somewhat slower than the RC4. In particular, the RC4 is almost twice as fast as the proposed solution. At the same time, this speed still is competitive compared to other systems. Given that based on secondary literature, the RC4 is almost three times faster than the AES-256 [G. Khaleel, S. Tuarev, I. Al-Shaihli, M. Tamrin: An Overview of cryptosystems based on finite automata. Jour. Advanced Review on Scientific Research, 27, Issue 1 (2016), 1-7], the proposed encryption and decryption system is at least one and a half times faster than the AES-256, and than the block encrypter detailed in the Hungarian patent application number P1300501, and is almost 100-times faster than the encryption systems described in the Hungarian patents number 227781 and 229534. Let us also remark that the public key encryption systems are about 1000-10000-times slower than the symmetric block ciphers. [https://www.cryptopp.com/benchmarks.html]

It is a further novel realisation that among the ciphers resistant to known plaintext attacks, the proposed system is faster (at least one and a half times) than the other discussed state-of-the-art systems.

It is also a novel realisation that once the transition matrix of the applied key automaton is a Latin square (a novelty), the system will have an advantage over other similar systems using key automata, namely that the statistical attacks deployed in the case of these other, similar systems [J. Dj. Dolic: Intrinsic statistical weakness of keystream generators. Proc. ASIACRPT 1994, pp 91-103.] will be ineffective in the case of this system, this way security significantly increases as compared to devices of earlier design. This is because the Latin square structure ensures that the key automaton does not have such a state into which it would transit with greater frequency than into any other state. This means that the attacker is unable to perform a frequency analysis, since each and every state has the same probability of occurrence, i.e. whatever the plaintext was, in the ciphertext there will be no states with greater or lesser frequency. Without the possibility of a frequency analysis, the attacker's only choice is the analysis based on brute force attack. As we shall see below, the brute force attack means the analysis of more than $1.01 \times 10^{118}$ possibilities, which even counting at a one-billion-possibility-per-second speed would last for $1.01 \times 10^{109}$ seconds, i.e. $3 \times 10^{101}$ years, which is obviously impossible. This is important, because if (using other methods) we almost always, or at least fairly frequently render the same cipher character to a given plaintext character, and (through a linguistic analysis or some other way) we already know the usual frequency of the given characters in the plaintext, then based on the ciphertext, the plaintext can be recovered within a few hours or even shorter time.

It is a further novelty that we can choose the transition matrix of the key automaton to be much smaller (even 16×16) than those of other state-of-the-art solutions. Given that a bit string with a numeric value between 0 and 15 may be stored at 4 bits, the required memory of a 16×16 transition matrix (consisting of 256 elements, each of them 4 bits/half a byte/) is only 256 bytes uncompressed and 128 bytes compressed.

The Hungarian patent number 227781 recommends a key automaton with 256 input signals and 512 states or 256 input signals and 128 states. Given that a bit string with a numeric value between 0 and 127 may be stored at 7 bits, i.e. the storage requirement of each element of the recommended smaller (256×128) transition matrix is 7 bits, the storage requirement of this key-size is 256×128×8 bits uncompressed, that is, 32768 bytes (i.e. 32 kilobytes), while compressed it is 256×128×7 bits, that is, 229376 bits, which is 28672 bytes (i.e. 28 kilobytes).

The Hungarian patent number 229534 recommends a key automaton with 256 input signals and 256 states. Given that the required storage for a bit string with a numeric value between 0 and 255 is 8 bits, i.e. one byte, in this case, the transition matrix requires 256×256 bytes, i.e., 65536 bytes (i.e., 64 kilobytes) of storage space.

The Hungarian patent application number P1300501 proposes an automata composition of $2^{128}$ input signals and $2^{128}$ states as a key automaton, the states of which are 16 byte-long bit strings. This requires $2^{128} \times 2^{128} \times 16 = 2^{260}$ bytes of storage, which cannot be stored directly. In this case, the possibility of storing in memory is achieved by a special compression method—the decomposition into component automata. In memory, it is necessary to store, among other things, a component automaton, which has 256 states and 65536 input signals in the proposed solution, which requires 16 megabytes of storage.

In summary, current state-of-the-art technology proposes key automata systems with much larger memory requirements than the one proposed in this specification.

If the key automaton size can be significantly reduced as compared to the key automaton dimensions used in the current state-of-the-art technology, this can have several advantages. The weakness of symmetric key systems is that the encryption (and decryption) key should be known by both partners for the exchange of messages. The key must therefore be sent to the partner in a secure way, no other person can obtain it and the recipient must be sure that the key was sent by the person who claims this. For this reason, in the vast majority of encryption systems the key sharing, that is, the sharing of the secret keys of symmetric encryption between the sender and the recipient of the secret message is done by means of a public key encryption system. The rate of public key encryption is substantially (about 1000 to 10,000 times) slower than that of symmetric encryption systems. [https://www.cryptopp.com/benchmarks.html] For this reason, it is highly beneficial to share symmetrical keys with relatively small (128 bytes or less) size. If the memory requirement of a key automaton matrix (which, in compressed form requires only 128 bytes memory) is 500-times smaller than that of other solutions (64 kilobytes or more memory), the key exchange will also be executed in 500-times shorter time.

Another great advantage of the small key size may be that it is possible to implement the system discussed in the present application at such a micro size that is impossible in current state-of-the-art technology. If for instance we choose to apply the Xoroshito pseudo random number generator [D. Backman and S. Vigna: xorosito128plus.c, http://xoroshiro.di.unimi.it/xoroshiro128 plus.c, 2016], the memory requirement of the encrypting and decrypting unit is less than 2 kilobytes. As it has already been mentioned, the memory requirement of the key automaton with a 16×16 transition matrix is 128 bytes compressed and 256 bytes uncompressed. (During key sharing, the compressed format, during encryption and decryption the uncompressed format is preferable, i.e. after key sharing, the transition matrix should be extracted.) A further 256 bytes are enough to store processing work data and buffer memory. For this purpose, the ATTINY45-20PU microcontroller with only 4 kilobytes of flash memory is sufficient. [http://hu.farnell.com/microchip/attiny45-20pu/mcu-8bit-attiny-20mhz-dip-8/dp/1288352?CMP=GRHB-FINDCHIPS-SEP] That this microcontroller is slow (20 MHz) makes the application more difficult. Further research is aimed at finding or developing the most suitable tools. With this solution—as opposed to other tools—it is possible to achieve implementation at a very low cost (at least 50% savings).

The third advantage of the small key size becomes evident during the generation of the Latin square that forms the key automaton's transition matrix. I. G. Sagstume's research shows that [I. G. Sagastume: Comparison of Seven Techniques for Generating Random Latin Cubes] using the fastest "SeqGen with random swapping" method on a non-disclosed type of computer with a JAVA implementation, the generation of a 30×30 Latin square required on average 0.0696 seconds, while the generation of a 256×256 Latin square lasted 2-10 seconds depending on the case. This means that in the case of key sharing, the generation of the transition matrix of the key automaton proposed here is executed at least 30-times faster than with other applications.

The question arises whether, in addition to the proposed small size, the proposed device and method also remains safe against cracking. H. J. Ryser's [Permanents and systems of distinct representatives. In: R. C. Bose and T. A. Dowling (eds.): Proc. Conf. Combinatorial Mathematics and its Applications, University of North Carolina, Apr. 10-14, 1967. Univ. North Carolina Press, Chapel Hill, 1969] classic results show that the number of n×n Latin squares is greater or equals $(n!)^{2n}/n^{n \times n}$. It follows that there are at least $(16!)^{32}/16^{16 \times 16}$, i.e. more than $1.01 \times 10^{118}$ 16×16 Latin squares. Given that this is substantially more than the $2^{128}$ (~$3.40 \times 10^{38}$) possibilities considered to be practically safe in cryptography, a brute force attack cannot be successful at this size.

DESCRIPTION OF THE INVENTION

The primary aim of the present invention is to provide a stream cipher cryptographic method and device for the encryption of plaintexts and the decryption of ciphertexts that has significant novelties and technical advantages over prior solutions offered by current state-of-the-art technology.

The aims set for the invention have been achieved through the method presented in claim 1 and through the apparatus described in claim 4. The modes of implementation will be discussed in subclaims.

THE BRIEF DESCRIPTION OF THE DRAWING

In what follows, we will present the invention's advantageous implementation forms as examples through drawings, where.

THE IMPLEMENTATION FORMS OF THE INVENTION

The invention includes a cryptographic device for stream cipher encrypting a plaintext; the device includes an input module for entering the plaintext, an output module for issuing the ciphertext, and a key automaton capable of converting plaintext ciphertext.

The invention further includes a cryptographic device for decrypting a ciphertext; the device comprises an input module for entering a ciphertext, an output module for issuing plaintext, and a key automaton for converting ciphertext into plaintext.

In both the cryptographic method and device for encrypting the plaintext according to the invention and in the cryptographic method and device for decrypting the ciphertext according to the invention, the key automaton is an automaton without output, whose transition matrix forms a Latin square.

The transition matrix of the automaton forms a Latin square if both the rows and the columns of the transition matrix form a permutation of the state set. The inverted automaton of such an automaton with a transition matrix is the automaton whose transition matrix forms a Latin square where the permutations of the rows of the inverse automaton's Latin square are the inverted permutations of the permutations of the rows of the original automaton's Latin square. Thus, the matrix element's value in column j of row i of the original matrix is exactly k if the matrix element in column k of row i of the inverse matrix is j. The key automaton is chosen so that the set of both its states and input signals coincide with the character set of the plaintext, which character set in turn coincides with the character set of the ciphertext.

The definitions necessary to understand the invention will be described below.

In case of any H set let |H| indicate the multiplicity of set H. Those matrices are called Latin squares over set H in which each row and each column are permutations of the elements of H. An automaton without output is an algebraic structure consisting of two non-empty sets, the state set and the input signal set, and a function (the transition function), which maps the Cartesian product of the state set and the input signal set into the state set. An automaton without output is conventionally marked as A=(A,X,δ), where A is the state set, X is the input signal set and δ: A×X→A is the transition function (that assigns a state to all those pairs, the first element of which is a state, while the second is an input signal).

The transition function can thus be characterized by the fact that this is a function that assigns a state to each pair whose first element is a state, the other element is an input signal.

In the followings, let us assume that the sets of states and input signals of the examined automaton are finite. We also assume that both the state set and the input signal set are ordered sets, and in this sense we will talk about the zero, first, second, . . . , and last element of these sets. (For technical reasons, we do not start counting from one, but from zero.)

In the case of finite state and input signal sets, the transition function (which in its general form is abstract) is usually represented as a matrix, which we call transition matrix. The transition matrix has as many rows as input signals, and there are as many columns as states of the automaton. An element k in the i-th row (numbering started from zero) and j-th column (numbering started from zero) of the transition matrix will be the serial number (numbering started from zero) of the state which is assigned to the pair consisting of the j-th state and the i-th input signal by the transition function. We say about this element k of the transition matrix in the i-th row and j-th column that the i-th input signal takes the automaton from the j-th state to the k-th state. (In fact, in this case it is also usual to say that the automaton goes from the j-th state to the k-th state under the effect of the i-th input signal i.)

The rows of the transition matrix can be identified with the input signals of the automaton, and its columns with the states of the automaton, while the transition matrix itself with the transition function of the automaton. The serial number of the input signals is therefore marked by the serial number of the rows, while the serial number of the states is indicated by the serial number of columns. Below—if it does not cause any misunderstanding—the input signals or states are sometimes identified by their serial number.

For instance, in the case of the A=($\{a_0,a_1,a_2\}$, $\{x_0,x_1\}$, $\delta$) automaton and the $\delta(a_0, x_0)=a_1$, $\delta(a_0, x_1)=a_2$, $\delta(a_1, x_0)=a_0$, $\delta(a_1, x_1)=a_0$, $\delta(a_2, x_0)=a_1$, $\delta(a_2, x_1)=a_1$ function values the transition matrix's shape will take the following shape:

| $\delta$ | $a_0$ | $a_1$ | $a_2$ |
|---|---|---|---|
| $x_0$ | $a_1$ | $a_0$ | $a_1$ |
| $x_1$ | $a_2$ | $a_0$ | $a_1$ |

In this example the 0. row of the transition matrix is marked $x_0$, its first row $x_1$, 0. column $a_0$, its first column $a_1$, its second column $a_2$.

The finite list (possibly including repetitions) constituted by the elements of the state set is called state sequence, while the finite list (possibly including repetitions) constituted by the elements of the input signal set is called input signal sequence. (State and input sequences of one length, i.e. consisting of one element, are also allowed.) Signal sequences made up of 0 or 1 (binary) elements we will also call bit sequences or bit chains. As it is customary, in the case of both state and input sequences, we will not mark the commas separating the elements of the sequences. If a $a_1$ $a_2$ . . . $a_s$ state sequence has at least three elements, then the $a_2$, the $a_3$, . . . , and the $a_{s-1}$ states will be referred to (also) as intermediate states of the given state sequence. Thus, state sequences of one or two elements have no intermediate states.

One can extend the automaton's transition function in a way that the extended transition function assigns a state sequence to each and every state and input signal sequence as follows: Let a be a state, and let $x_1 x_2 \ldots x_s$ an input signal sequence (where $x_1$, $x_2$, . . . , and $x_s$ are input signals). Let $a_1$ regularly mark the state, into which the automaton is taken from state a by the input signal $x_1$, the state $a_2$ into which the automaton is taken from the state $a_1$ by the input signal $x_2$, the state $a_3$ into which the automaton is taken from the state $a_2$ by the input signal $x_3$, . . . , and the state $a_s$ into which the automaton is taken from the state $a_{s-1}$ by the input signal $x_s$. Then, according to the definition, the extended transition function assigns to the pair consisting of state a and input signal sequence x1 . . . xs the state sequence a1 . . . as. Then we can also say that the input signal sequence $x_1 x_2 \ldots x_s$ takes the automaton through the state sequence $a_1 a_2 \ldots a_{s-1}$ from state a to state $a_s$, and we can also say that the automaton goes from state a to state $a_s$ through state sequence $a_1 a_2 \ldots a_{s-1}$ under the effect of input signal sequence $x_1 x_2 \ldots x_s$. Whenever it is not necessary, we omit the expression "through the state sequence $a_1 a_2 \ldots a_{s-1}$", and simply write that input signal sequence $x_1 x_2 \ldots x_s$ takes the automaton from state a to state $a_s$, and also that the automaton goes from state a to state $a_s$ under the effect of input signal sequence $x_1 x_2 \ldots x_s$.

By character set in the most general sense we mean an ordered non-empty and finite set (for example, for binary data, $\{0,1\}$ numbers, for text the letters of the alphabet etc.). Data encrypted and decrypted can also be referred to as "text"; hereafter, this expression will often be used. The strings of characters created from the character sets of unencrypted (plain), and encrypted (cipher) texts, or character sequences created from any other character set will also be called character chains.

Any character sequence $x_1$, $x_2$, . . . , $x_s$ constituting character chain $x_1 x_2 \ldots x_s$ has a mirror image, which means the $(x_1 x_2 \ldots x_s)^T = x_s x_{s-1} \ldots x_1$ character chain.

According to the invention, during encryption by the key automaton, an encrypted character is created for each (unencrypted) character of the plaintext, and the ciphertext is obtained by concatenating (positioning them in sequence and then linking) the resulting characters.

The key automata preferably process 1-byte-long characters in one step. The automata can be designed to process states and input signals characterized by arbitrary character sets, but in the case of any text to be processed, any information (e.g. media) or other data it is desirable that the unencrypted text be converted into a binary form, i.e. to convert them into bit chains.

In the method and device of the present invention therefore, the key automaton is used during both the encryption and decryption process.

In the present invention, stream cipher encryption is used, in which the encryption passes from character to character.

As discussed above, the present invention's method and device for encrypting plaintexts, the ciphertext's next character (at first the first one) is chosen to be that given character which corresponds to the key automaton's that given state into which the state corresponding to the plaintext's next (at first the first) character is transferred by the key automaton's that given input signal sequence, which corresponds to the next (at first the first) block generated by the pseudo random number generator. If, therefore, the plaintext's next (at first the first) character is a, the next (at first the first) string generated by the pseudo random number generator is p, then the ciphertext's next (at first the first) character is $\delta(a, p)$.

In the present invention's method and device for decrypting ciphertexts, we create a sequence of pseudo random numbers using the pseudo random number generator's seed (in a similar fashion to encryption), and with the help of the ciphertext's next (at first the first) character b and the pseudo random number generator's next (at first the first) pseudo random string p we can arrive at the next (at first the first) character a of the plaintext; this is done by creating that given state a of the key automaton's inverted automaton, into which the inverted automaton of the key automaton goes from state b under the effect of the mirror image $p^T$ of the input word p. Thus $a=\delta^{-1}(b, p^T)$, where $\delta^{-1}$ denotes the transition function of the inverted automaton of the key automaton.

Some implementation forms of the invented method are applicable to the implementation forms of the invented device—all of which can be equally used for encryption and decryption as well. The following is a description of performing a method in accordance with an implementation form of the invented method designed for encrypting and decrypting on certain corresponding implementation forms of the invented device.

EXAMPLE

A simplified example illustrates the encryption and decryption process of the present invention; the solution offered by the present invention may be generalized easily. Consider the following four-state and four-input signal key automaton A:

| δ | 0 | 1 | 2 | 3 |
|---|---|---|---|---|
| 0 | 1 | 2 | 3 | 0 |
| 1 | 3 | 0 | 1 | 2 |
| 2 | 2 | 3 | 0 | 1 |
| 3 | 0 | 1 | 2 | 3 |

The transition matrix's row 0 lists the states, while its column 0 lists the possible input signals. In the present example it is also fulfilled that the state set and the input signal set of the key automaton is the same, but in some implementation forms, the state set and the input signal set of key automaton may be different. This transition matrix forms a Latin square. The key automaton's state set is {0,1,2,3}, which coincides with the input signal set of the key automaton, and with the character sets of both the plaintext and the ciphertext.

Let us suppose, that the seed of the pseudo random number generator is the string m=123, and for the sake of simplicity, let us suppose, that for every n≥1 the subsequent (at first the first) pseudo random number generated is that given quaternary numeral system string, the numerical value of which is $p_n=(n+1)\cdot m \mod 2^4$. In that case, the pseudo random numbers generated are the following: $p_1=312$, $p_2=101$, $p_3=230$, $p_4=013$, $p_5=202$, $p_6=120$, $p_7=003$, $p_8=132$.

First we will present encryption through the above example. Let us consider the hexadecimal numeral system-based 4F4B ASCII code of the word OK (the plaintext belongs to the word OK). Converting this 4F4B hexadecimal value into quaternary numeral system, we arrive at the string 10331023. This string is the plaintext.

During encryption, let us add to A as input the pseudo random input signal sequence $p_1=312$, which was generated by the pseudo random number generator from the m=123 seed. This input signal sequence takes the key automaton to match the first character of the plaintext, i.e., from state 1 to state 2 as follows:

The key automaton A
goes from state 1 to state 1 under the effect of input signal 3,
goes from state 1 to state 0 under the effect of input signal 1,
goes from state 0 to state 2 under the effect of input signal 2.

After that, let us add to A as input the second pseudo random input signal sequence $p_2=101$, which was generated by the pseudo random number generator. This input signal sequence takes the key automaton to match the second character of the plaintext, i.e., from state 0 to state 3 as follows:

The key automaton A
goes from state 0 to state 3 under the effect of input signal 1,
goes from state 3 to state 0 under the effect of input signal 0,
goes from state 0 to state 3 under the effect of input signal 1.

After that, let us add to key automaton A as input the third pseudo random input signal sequence $p_3=230$, which was generated by the pseudo random number generator. This input signal sequence takes the key automaton to match the third character of the plaintext, i.e., from state 3 to state 2 as follows:

The key automaton A
goes from state 3 to state 1 under the effect of input signal 2,
goes from state 1 to state 1 under the effect of input signal 3,
goes from state 1 to state 2 under the effect of input signal 0.

After that, let us add to key automaton A as input the fourth pseudo random input signal sequence $p_4=013$, which was generated by the pseudo random number generator. This input signal sequence takes the key automaton to match the fourth character of the plaintext, i.e., from state 3 to state 3 as follows:

The key automaton A
goes from state 3 to state 0 under the effect of input signal 0,
goes from state 0 to state 3 under the effect of input signal 1,
goes from state 3 to state 3 under the effect of input signal 3.

After that, let us add to key automaton A as input the fifth pseudo random input signal sequence $p_5=132$, which was generated by the pseudo random number generator. This input signal sequence takes the key automaton to match the fifth character of the plaintext, i.e., from state 1 to state 2 as follows:

The key automaton A
goes from state 1 to state 3 under the effect of input signal 2,
goes from state 3 to state 0 under the effect of input signal 0,
goes from state 0 to state 2 under the effect of input signal 2.

Under the effect of the sixth pseudo random number $p_6=120$ generated by the pseudo random number generator as input word, the key automaton goes into a state matching the sixth character of the plaintext, i.e. from state 0 to state 2 in the following manner:

The key automaton A
goes from state 0 to state 3 under the effect of input signal 1,
goes from state 3 to state 1 under the effect of input signal 2,
goes from state 1 to state 2 under the effect of input signal 0.

Under the effect the seventh pseudo random number $p_7=003$ generated by the pseudo random number generator as input word, the key automaton goes into a state matching the seventh character of the plaintext, i.e. from state 2 to state 0 in the following manner:

The key automaton A
goes from state 2 to state 3 under the effect of input signal 0,
goes from state 3 to state 0 under the effect of input signal 0,
goes from state 0 to state 0 under the effect of input signal 3.

Finally, under the effect of the eighth pseudo random number $p_8$=132 generated by the pseudo random number generator as input word, the key automaton passes into a state matching the plaintext's eighth character, i.e. from state 3 to state 0 in the following manner:

The key automaton A
goes from state 3 to state 2 under the effect of input signal 1,
goes from state 2 to state 2 under the effect of input signal 3,
goes from state 2 to state 0 under the effect of input signal 2.

This way the ciphertext will be 23232200.

The following section describes the decryption of the ciphertext. For encryption and decryption according to the present invention, and so in this example as well, we will apply the inverted automaton of the key automaton A. The transition table of the inverted key automaton will be:

| $\delta^{-1}$ | 0 | 1 | 2 | 3 |
|---|---|---|---|---|
| 0 | 3 | 0 | 1 | 2 |
| 1 | 1 | 2 | 3 | 0 |
| 2 | 2 | 3 | 0 | 1 |
| 3 | 0 | 1 | 2 | 3 |

Let us consider the 23232200 string as ciphertext.

During decryption, let us add to the inverted key automaton as input the mirror image $p_1^T$=213 of the pseudo random signal sequence $p_1$=312, which we have generated by the pseudo random number generator from seed m=123. This input signal sequence $p_1^T$ takes the inverted key automaton to match the first character of the ciphertext, i.e., from state 2 to state 1 in the following manner:

The inverted key automaton
goes from state 2 to state 0 under the effect of input signal 2,
goes from state 0 to state 1 under the effect of input signal 1,
goes from state 1 to state 1 under the effect of input signal 3.

After that, let us add to the inverted key automaton as input the mirror image $p_2^T$=101 of the second pseudo random signal sequence $p_2$=101, generated by the pseudo random number generator. This input signal sequence $p_2^T$ takes the inverted key automaton to match the second character of the ciphertext, i.e., from state 3 to state 0 as follows:

The inverted key automaton
goes from state 3 to state 0 under the effect of input signal 1,
goes from state 0 to state 3 under the effect of input signal 0,
goes from state 3 to state 0 under the effect of input signal 1.

After that, let us add to the inverted key automaton as input the mirror image $p_3^T$=032 of the third pseudo random signal sequence $p_3$=230, generated by the pseudo random number generator. This input signal sequence $p_3^T$ takes the inverted key automaton to match the third character of the ciphertext, i.e., from state 2 to state 3 as follows:

The inverted key automaton
goes from state 2 to state 0 under the effect of input signal 2,
goes from state 0 to state 0 under the effect of input signal 3,
goes from state 0 to state 3 under the effect of input signal 0.

After that, let us add to the inverted key automaton as input the mirror image $p_4^T$=310 of the fourth pseudo random signal sequence $p_4$=013, generated by the pseudo random number generator. This input signal sequence takes the inverted key automaton to match the fourth character of the ciphertext, i.e., from state 3 to state 3 as follows:

The inverted key automaton
goes from state 3 to state 3 under the effect of input signal 3,
goes from state 3 to state 0 under the effect of input signal 1,
goes from state 0 to state 3 under the effect of input signal 0.

After that, let us add to the inverted key automaton as input the mirror image $p_5^T$=202 of the fifth pseudo random signal sequence $p_5$=202, generated by the pseudo random number generator. This input signal sequence takes the inverted key automaton to match the fifth character of the ciphertext, i.e., from state 2 to state 1 as follows:

The inverted key automaton
goes from state 2 to state 0 under the effect of input signal 2,
goes from state 0 to state 3 under the effect of input signal 0,
goes from state 3 to state 1 under the effect of input signal 1.

Under the effect of the mirror image $p_6^T$=021 of the sixth pseudo random signal sequence $p_6$=120, generated by the pseudo random number generator as input word, the inverted key automaton goes into a state matching the ciphertext's sixth character, i.e. from state 2 to state 0 in the following manner:

The inverted key automaton
goes from state 2 to state 3 under the effect of input signal 1,
goes from state 3 to state 1 under the effect of input signal 2,
goes from state 1 to state 0 under the effect of input signal 0.

Under the effect of the mirror image $p_7^T$=300 of the seventh pseudo random signal sequence $p_7$=003, generated by the pseudo random number generator as input word, the inverted key automaton goes into a state matching the ciphertext's seventh character, i.e. from state 0 to state 0 in the following manner:

The inverted key automaton
goes from state 0 to state 0 under the effect of input signal 3,
goes from state 0 to state 3 under the effect of input signal 0,
goes from state 3 to state 2 under the effect of input signal 0.

Finally, under the effect of the mirror image $p_8^T$=231 of the eighth pseudo random signal sequence $p_8$=132, generated by the pseudo random number generator as input word, the inverted key automaton goes into a state matching the ciphertext's eighth character, i.e. from state 0 to state 3 in the following manner:

The inverted key automaton
goes from state 0 to state 2 under the effect of input signal 2,
goes from state 2 to state 2 under the effect of input signal 3,
goes from state 2 to state 3 under the effect of input signal 1.

The following string is obtained by linking the new states obtained as a result of state transitions: 10331023. That is, we recovered the original plaintext.

The Suggested Implementation of the Device

Figure 1:
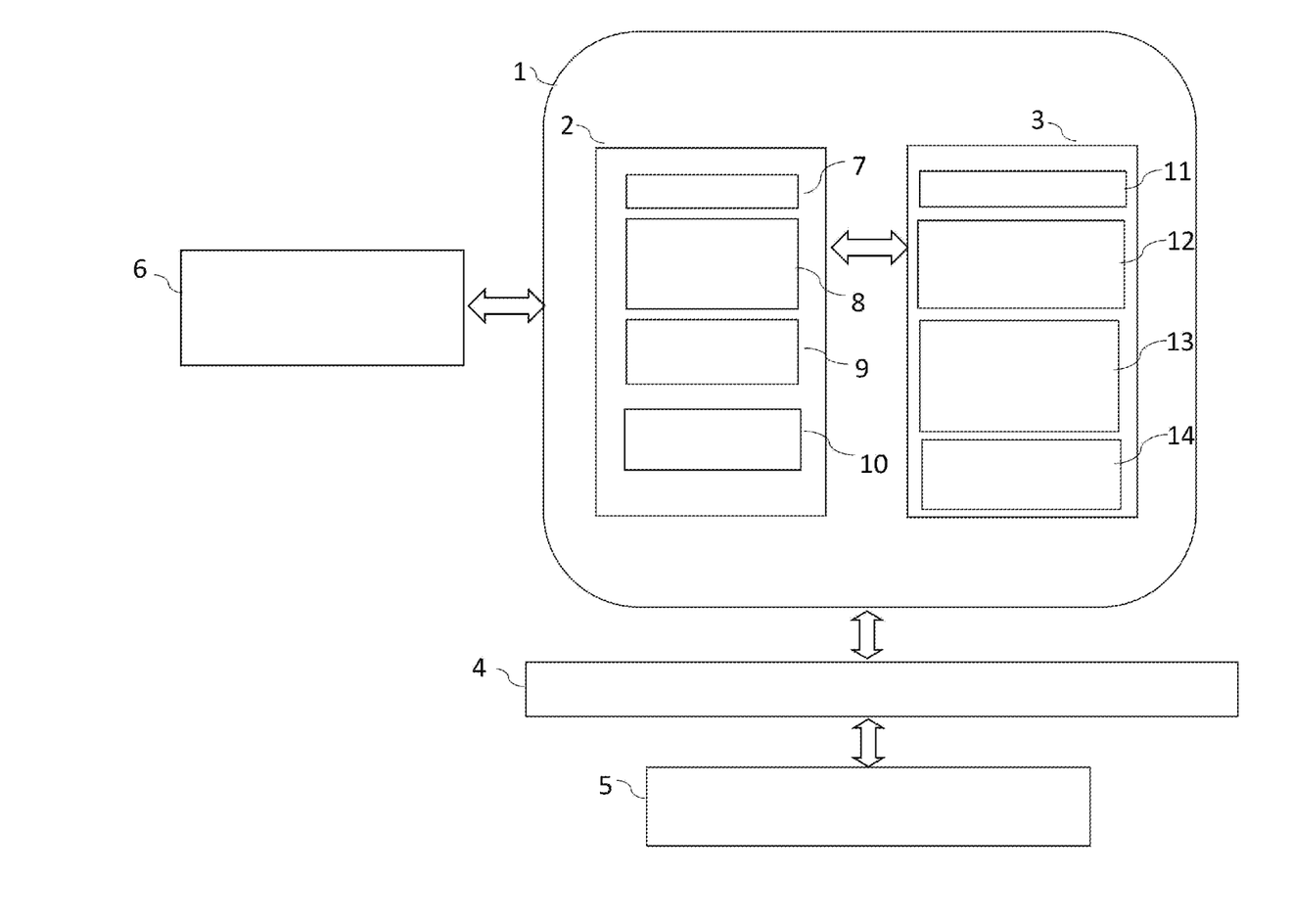
FIG. 1 is a drawing presenting one of the implementation forms of the cryptographic data stream cipher encryption and decryption device proposed in this patent.

The cryptographic device illustrated as an example in FIG. 1 can be used in encryption and decryption mode as well. The input of the device in the encryption mode is the plaintext, while in decryption mode it is the ciphertext. The output of the device in the encryption mode is the encrypted text, while in decryption mode it is the recovered text in its original form. The device performs a stream cipher encryption.

The cryptographic apparatus illustrated as an example in FIG. 1 is connected with a input/output data buffer 5 bi-directional link (which can be used as input and output as well) to the SPI data bus 4, which in turn is further bi-directionally connected to the execution unit 1. The data memory 3 and the program memory 2 are embedded in the execution unit 1. The execution unit 1 is bi-directionally connected to the SPI data bus 4 and the input/output data buffer 5 (buffering input and output data and serving as temporary data storage) connect to the SPI data bus 4 with a bi-directional connection.

Into the program memory 2 we can allocate (burn) the program for the key exchange and for the pseudo random number generation method, and the program for the encryption in FIG. 1, and for the decryption in FIG. 1.

The data memory 3 stores the key automata 11, the pseudo random number seed 12, the buffer memory 13 for storing plain- and ciphertexts and the processing work data 14.

The microcontroller 1 performs the interpretation of the operation of the following subunits.

The Key Exchange Executive Unit 7.

The key sharing of symmetric key systems, that is, the exchange of secret keys usually happens with the help of public key systems, or the use of a Diffie-Hellmann key exchange protocol. The secret key components of the method and device of the present invention are: the key automaton's 11 transition matrix and preferably a 16-byte-long string which is the fixed (secret) seed 12 of the pseudo random number generator 8.

The key exchange between a sender and a recipient of a secret message is preferably achieved by using a public key such as RSA 2048 or a Diffie-Hellmann key exchange protocol. The key automaton 11 preferably has 256 states and 256 input signals in a way that its states and input signals are 1 byte in length. The unit executing the pseudo random number generation for encryption and decryption is located in the program memory 2, while the key automaton 11 is stored in the data memory 3. The key automaton 11 is designed as an automaton with a transition matrix for an n natural number (preferably n=256) of an n×n-type Latin square, i.e., both the rows and columns of the transition matrix are permutations of the {1, . . . , n} set; due to an identical input signal the key automaton's two different states cannot pass into one and the same state.

Pseudo Random Number Generator 8.

Secondary literature knows of several pseudo random number generators 8 [see e.g. https://en.wikipedia.org/wiki/Pseudorandom_number_generator]. One can choose any method and device known to secondary literature as a pseudo random number generator 8, but in a preferred implementation form for encryption and decryption, in the case of preferably 16-character (128-bit) pseudo random strings the Xoroshito 128+(XOR \ rotate \ shift \ rotate) pseudo random number generator is recommended [D. Backman and S. Vigna: xorosito128plus.c, http://xoroshiro.di.unimi.it/xoroshiro128plus.c, 2016].

Preferably, the seed 12 of the pseudo random number generator 8 is a 128 bit randomly selected bit chain, and the generated pseudo random numbers are preferably 128 bit-long bit chains.

The pseudo random number generator 8 located in the program memory 2 plays a role in both encryption and decryption. The seed 12 of the pseudo random number generator 8 necessary for encryption and decryption and the generated pseudo random numbers are stored in the data memory 3.

Encryption Unit 9.

The plaintext is encrypted with stream cipher encryption, as described above. The encryption device is stored in program memory.

Decrypting Unit 10.

Reverses the secret text as described above. The decoding equipment is stored in the program memory.

In order to achieve a higher speed of operation, the input/output data buffer 5 should be as large as possible, in order to scan the public texts awaiting encryption through the input unit or to issue the secret sections through the output unit.

The processing work data 14 generated during the execution is stored in the data memory 3. It is also in the data memory 3 that the buffered scanned or processed part of the plain- and ciphertext 13, the seed 12 of the pseudo random number generator 8, the key automaton 11 and its current state are stored.

For example, the various blocks of the present implementation form of the cryptographic device can be realized by means of the following products (FIG. 1):

The operation of the key automaton 11, the pseudo random number generator 8, the encryption 9 of FIG. 1, and the decryption 10 of FIG. 1 are performed, for example, by a Microchip PIC32MX795F512L type microcontroller. Integrated into the microcontroller 1, for example can be 512 kilobytes of flash type program memory 2 with a 3 kilobyte boot flash and 128 kilobytes of SRAM type data memory 3. For example, two 5 23LC1024-type 1 Mbit SRAM memories are connected to the microcontroller through a 4 SPI bus for buffering incoming and outgoing data (input/output data buffer 5). As an example, a FullSpeed USB controller 6 might be integrated into the microcontroller 1, and this peripheral unit can be used to create a communication channel that conforms to the USB HID (Device Class Definition for Human Interface Devices (HID) Firmware Specification-6/27/01).

It should be noted that this design is very similar to the one used in the P1300501 patent application. A significant difference is caused by the fact that as microcontroller we apply a member of the PIC32MX microcontroller family which has a larger memory capacity, namely, the PIC32MX795F512L microcontroller 1 (512 kilobytes, i.e. eight times larger program memory and 128 kilobytes, that is, 16 times larger data memory). Thus, it is possible to design the present output blocks (pseudo random generation, key automaton 11 operation, encryption unit 9 and decrypting unit 10) in a way that they all get incorporated into the microcontroller 1. This results in a method and device that is more easily applicable and has greater encrypting and decoding speed. The other significant difference is that, in the present implementation, the role and function of the built-in units is significantly different from the one used in the P1300501 patent application. During this operation, we are working only with the repetition of a single, very quick and simple operation type.

As mentioned, in the method and device of the present invention, the transition matrix of the key automaton 11 must be a Latin square.

The method and device of the invention differ substantially from the solutions described in the Hungarian patents 227781 and 229534, among others, in the followings:

In the method and device according to the invention, we apply a key automaton that structurally differs from the known solutions mentioned above.

The method and device of the present invention uses encryption and decryption the principle of which is different from the known solutions, enabling faster encryption and decryption (fewer steps) than those above.

The solution used in the method of the present invention makes it possible for the ciphertext to be not several times longer than the length of the plaintext. (In the solution used in the method of the present invention, the length of the ciphertext is equal to the length of the plaintext, which makes the method of the invention considerably more economical than the known solutions. This latter feature cannot be solved with the Hungarian patent applications 227781 and 229534, as these solutions often have a longer ciphertext than the length of the plaintext.)

The current matrix of key automaton of the method and device of the present invention forms a Latin square that is resistant to statistical-type cryptographic attacks.

During operation, we only rely on the repeated application of a very fast type of procedure.

In addition to the examples above, within the circle of protection, the invention can be realized in other implementation forms and with other manufacturing procedures as well.

The invention claimed is:

1. A symmetric key stream cipher cryptographic method for encrypting a plaintext, the method comprising the steps of:

scanning the plaintext to be encrypted with an input/output data buffer, performing encryption using a key automaton, characterized in that a pseudo random character sequence of a given length is generated based on a seed of a pseudo random number generator for a subsequent character of the plaintext, the transition matrix of the key automaton being a 16×16 or 256×256 Latin square is stored in a data memory and the key automaton is an automaton without output, and in the course of the encryption of the subsequent character of the plaintext, transmitting the pseudo random character sequence to the key automaton as input signal sequence, and creating with the key automaton a subsequent character of a ciphertext, which is chosen to be the last element of a state sequence through which the key automaton is transited starting from a state being the same as the subsequent character of the plaintext scanned by the input/output data buffer effected by the input signal sequence.

2. A symmetric key stream cipher cryptographic method for decrypting the ciphertext encrypted by the method according to claim 1, the method comprising the steps of:

scanning the ciphertext to be decrypted with an input/output data buffer, performing decryption using the key automaton's inverted key automaton, characterized in that a pseudo random character sequence of a given length is generated based on the seed of the pseudo random number generator for a subsequent character of the ciphertext, the transition matrix of the key automaton's inverted key automaton being a 16×16 or 256×256 Latin square is stored in a data memory and the key automaton's inverted key automaton is an automaton without output, and in the course of the decryption of the subsequent character of the ciphertext, transmitting a mirror image of the pseudo random character sequence to the key automaton's inverted key automaton as input signal sequence, and creating with the key automaton's inverted key automaton a subsequent character of a plaintext, which is chosen to be the last element of a state sequence through which the key automaton's inverted key automaton is transited starting from a state being the same as the subsequent character of the ciphertext scanned by the input/output data buffer effected by the input signal sequence.

3. The method according to claim 1, characterized in that the pseudo random character sequence is 16- or 32-characters-long.

* * * * *